United States Patent
Van Zyl

[11] 3,841,183
[45] Oct. 15, 1974

[54] SHEARING MACHINE
[75] Inventor: Josias Van Zyl, Northcliff, South Africa
[73] Assignee: Intermenua (Proprietary) Limited, Johannesburg, South Africa
[22] Filed: July 31, 1972
[21] Appl. No.: 276,740

[52] U.S. Cl. .................................. 83/157, 83/636
[51] Int. Cl. ............................................ B26d 7/06
[58] Field of Search ............. 83/157, 167, 454, 456, 83/694, 373, 459, 636

[56] References Cited
UNITED STATES PATENTS
| | | |
|---|---|---|
| 2,933,966 | 4/1960 | Dehn ................................... 83/373 |
| 3,126,816 | 3/1964 | Thompson ....................... 83/157 X |
| 3,421,394 | 1/1969 | Ammons et al. ..................... 83/157 |
| 3,492,898 | 2/1970 | Benz ................................... 83/157 |
| 3,631,750 | 1/1972 | Hanni ................................. 83/157 |

FOREIGN PATENTS OR APPLICATIONS
| | | |
|---|---|---|
| 615,716 | 10/1935 | Germany ............................ 83/157 |

Primary Examiner—Andrew R. Juhasz
Assistant Examiner—W. D. Bray
Attorney, Agent, or Firm—Stevens, Davis, Miller & Mosher

[57] ABSTRACT

The invention is concerned with a shearing machine of the kind provided with a displaceable supporting table in which the table is mounted for pivotal movement between operative and discharge positions.

3 Claims, 3 Drawing Figures

PATENTED OCT 15 1974     3,841,183

SHEARING MACHINE

CROSS-REFERENCE TO RELATED APPLICATIONS

Reference may be made to U.S. Ser. No. 276,739, filed July 31, 1972, by the inventor of the present invention.

This invention relates to shearing machines of the kind provided with displaceable supporting table.

Such shearing machines have recently become known to those engaged in the field of machine tools. They have as their main object shearing without distortion. One arrangement of such shearing machines comprises a first fixed blade and a second blade movable over the first blade to set up a shearing action along their leading edges, a continuously yieldable support located in a resting position adjacent to the leading edge of the first blade in the path of the second blade and biasing means acting to resist displacement of the support from its resting position as the second blade is advanced over the first blade.

In such shearing machines proposed to date, difficulty or inconvenience may be experienced in retrieving narrow strips cut by the machine.

An object of the present invention is the provision of a shearing machine in which discharge of cut strips from the machine is facilitated.

According to the invention, a shearing machine of the kind provided with a displaceable supporting table includes mounting means for attaching the supporting table to the frame of the machine, the mounting means being adapted to permit the supporting table to be swung between an operative position and a discharge position, and displacement means adapted for moving the supporting table between its operative and its discharge positions.

Further, according to the invention the mounting means is adapted to allow the supporting table to be swung about an axis parallel to its longitudinal axis.

The displacement means may comprise one or more piston and cylinder combinations mounted for operation between the frame of the machine and the supporting table.

By the way of example only, a preferred embodiment of the invention will now be described with reference to the accompanying drawings in which.

Figure 1:
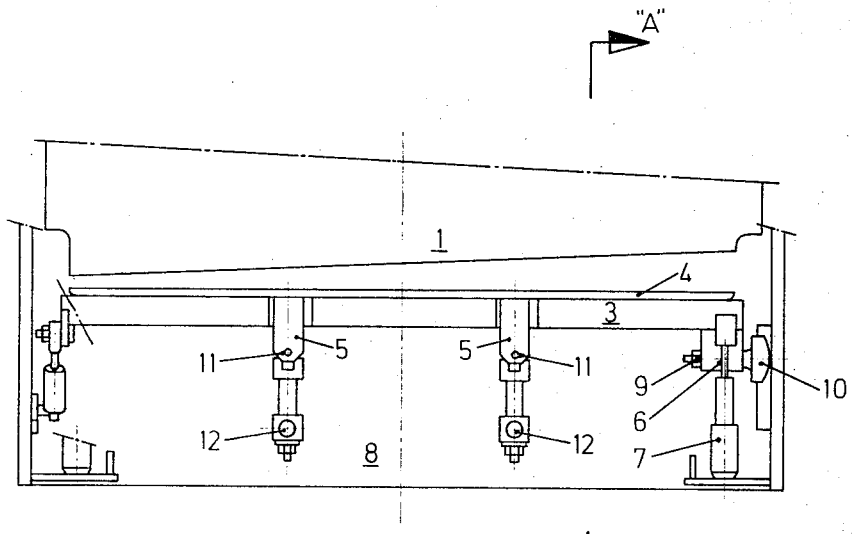
FIG. 1 is a diagrammatic front elevation, with parts broken away, of a shearing machine having a displaceable supporting table which is shown in its operative position.

The shearing machine comprises an upper moving blade 1 and a lower fixed blade 2. Located adjacent to the lower fixed blade 2 and in the path of the moving blade 1 is a supporting table 3 having resting on it a leaf spring 4. The spring 4 is bowed along its length so that when resting in its free condition, the central portion of the spring curves towards the blade 1. A pair of stirrups 5 are provided which draw the spring down onto the supporting table 4.

The extremities of the supporting table 3 are mounted to the free ends of piston rods 6 which operate in cylinders 7, only one of which is shown at the right hand side of the supporting table. Linear movement of the supporting table is constrained to a plane parallel to the plane in which blade 1 moves. In order to permit the table to pivot about an axis parallel to its longitudinal axis, a guide 10 is provided with a bolt 9 which engages piston rod 6 on about which the extremity of supporting table 3 is free to pivot.

Furthermore, stirrup 5 is provided with a universal joint 11 and is secured to the frame 8 by means of bolt 12 about which it can pivot.

Figures 2, 3:
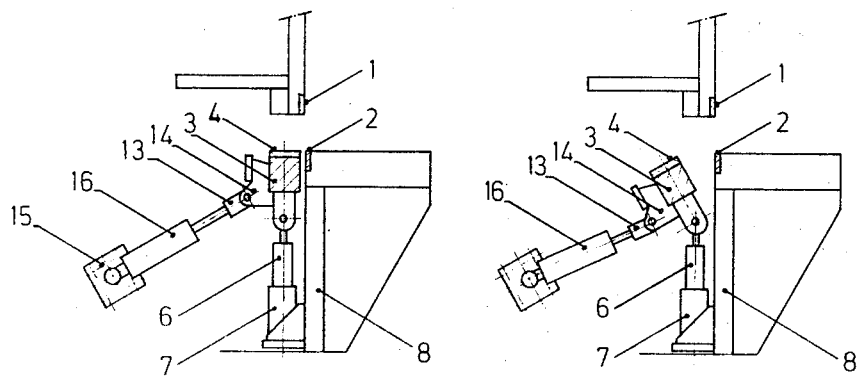
FIG. 2 is a section on the line AA with the shearing machine's supporting table shown in its operative position.
FIG. 3 is the same view as FIG. 2 with the supporting table shown in its discharge position.

Through the provision of such pivotal and universal movements, the supporting table is free to be moved from an operative position shown in FIG. 2, to a discharge position shown in FIG. 3. Such movement is controlled hydraulically through displacement means comprising a piston and cylinder arrangement, the piston having its connecting rod attached for pivotal movement to bracket 13 and the cylinder having its free end pivotally attached to plate 15 which in turn is secured to the machine frame 8.

In the operative position of the supporting table 3 (see FIG. 2), support is provided for off cut sections during operation of the machine. If the width of any off cut section should be in the order of the width of the spring blade 4, or less, resulting in the section remaining on the spring blade after the shearing cycle has been completed, the piston in cylinder 16 is actuated causing the supporting table to be swung from its operative position. As a result the off cut section is discharged from the supporting table. If desired, the movement of the supporting table can be regulated so that the off cut section is discharged into a suitable chute (not shown).

The cylinder 16 is connected to the hydraulic system of the shearing machine and is therefore operated through the control system of the machine.

Other embodiments of the invention exist and the invention is therefore not to be construed as limited to the particular example described above.

Thus in certain circumstances it may be more convenient for the supporting table to be swung manually between its two positions. In other instances, it may be more convenient for movement of the supporting table to be in accordance with the movement of the moving blade in which case the supporting table may be mechanically or hydraulically linked to the moving blade.

I claim:

1. A shearing machine comprising a fixed blade, a movable blade movable over the fixed blade to set up a shearing action along the shearing edges, a work support member located in a rest position adjacent to and along substantially the length of the shearing edge of the fixed blade in the path of the movable blade and yieldably supported against downward displacement by the movable blade during a shearing stroke, mounting means attaching the work support member to a frame of the machine, the mounting means permitting the work support member to swing between an operative position and a discharge position, and displacement means for swinging the work support member between its operative position and its discharge position while the work support member is not urged downward by the movable blade.

2. A shearing machine as claimed in claim 1 wherein the mounting means is adapted to allow the work support member to swing about an axis parallel to its longitudinal axis.

3. A shearing machine as claimed in claim 2 wherein the displacement means comprises at least one piston and cylinder mounted for operation between the frame of the machine and the work support member.

* * * * *